US012665828B2

(12) United States Patent     (10) Patent No.: US 12,665,828 B2
Gautam et al.     (45) Date of Patent: Jun. 23, 2026

(54) METHOD AND APPARATUS FOR HANDLING PERFORMANCE OF EDGE NETWORK ENTITIES IN A MOBILE COMMUNICATION SYSTEM

(71) Applicant: Samsung Electronics Co., Ltd., Suwon-si (KR)

(72) Inventors: Deepanshu Gautam, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 18/010,102

(22) PCT Filed: Jun. 23, 2021

(86) PCT No.: PCT/KR2021/007896
    § 371 (c)(1),
    (2) Date: Dec. 13, 2022

(87) PCT Pub. No.: WO2021/261917
    PCT Pub. Date: Dec. 30, 2021

(65) Prior Publication Data
    US 2023/0269158 A1     Aug. 24, 2023

(30) Foreign Application Priority Data

Jun. 23, 2020   (IN) .............................. 202041026615
    Jun. 15, 2021   (IN) ........................... 2020 41026615

(51) Int. Cl.
    *H04L 43/0864*     (2022.01)
(52) U.S. Cl.
    CPC ............................... *H04L 43/0864* (2013.01)

(58) Field of Classification Search
    CPC . H04L 43/0864; H04L 41/0897; H04L 43/08;
        H04L 43/12; H04L 43/16; H04L 43/065;
                                        H04W 24/08
    See application file for complete search history.

(56) References Cited

U.S. PATENT DOCUMENTS 11,601,434 B1 *   3/2023   Hornsby ............... H04L 63/029
    2020/0178149 A1   6/2020   Seenappa et al.
                    (Continued)

FOREIGN PATENT DOCUMENTS

WO     2017/177042 A1   10/2017
    WO     2020/033424 A1    2/2020

OTHER PUBLICATIONS

3GPP; TSG SA; Management and orchestration; Performance assurance (Release 16)', 3GPP TS 28.550 V16.4.0, Mar. 27, 2020.
                    (Continued)

*Primary Examiner* — Schquita D Goodwin
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments disclosed herein relate a method for handling performance of an edge network entity (300) in an edge data network (1000). The method includes creating, by an edge consumer (100), a measurement job request to collect performance measurement information associated with the edge network entity (300). Further, the method includes sending, by the edge consumer (100), the created (Continued)

measurement job request to an edge producer (200). Further, the method includes receiving, by the edge consumer (100), the performance measurement information associated with the edge network entity (300) from the edge producer (200) based on the created measurement job request.

10 Claims, 12 Drawing Sheets

(56) References Cited

U.S. PATENT DOCUMENTS

| | | | |
|---|---|---|---|
| 2021/0021494 A1* | 1/2021 | Yao ..................... | H04L 41/0631 |
| 2021/0022182 A1* | 1/2021 | Mondal .............. | H04W 56/001 |
| 2021/0112438 A1* | 4/2021 | Soloway .............. | H04L 47/748 |
| 2021/0160147 A1 | 5/2021 | Chou et al. | |
| 2021/0274366 A1* | 9/2021 | Yao .................... | H04L 43/0817 |
| 2021/0289400 A1* | 9/2021 | Matolia ................... | H04L 67/10 |
| 2022/0174521 A1* | 6/2022 | Yao ......................... | H04L 43/10 |
| 2023/0316684 A1* | 10/2023 | Otsuki ................ | H04B 7/0695 |
| | | | 345/633 |

OTHER PUBLICATIONS

3GPP; TSG SA; Architecture for enabling Edge Applications; (Release 17)', 3GPP TS 23.558 V0.3.0, Jun. 4, 2020.
Indian Office Action dated May 27, 2022, issued in Indian Patent Application No. 202041026615.

* cited by examiner

400

| Create a measurement job request to collect performance measurement information associated with edge network entity | 402 |

| Send the created measurement job request to an edge producer | 404 |

| Receive the performance measurement information associated with the edge network entity from the edge producer based on on the created measurement job request | 406 |

FIG. 5

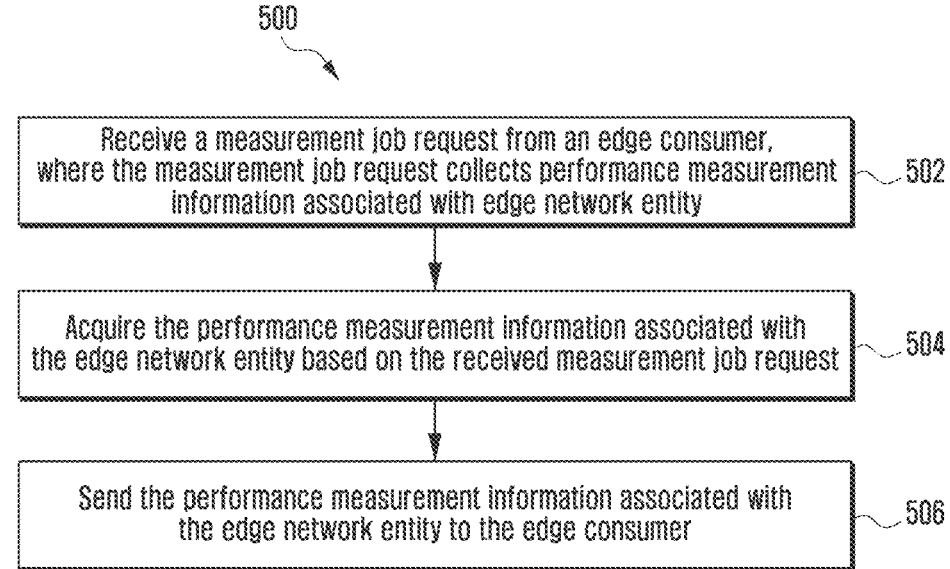

500

Receive a measurement job request from an edge consumer, where the measurement job request collects performance measurement information associated with edge network entity — 502

Acquire the performance measurement information associated with the edge network entity based on the received measurement job request — 504

Send the performance measurement information associated with the edge network entity to the edge consumer — 506

FIG. 8

METHOD AND APPARATUS FOR HANDLING PERFORMANCE OF EDGE NETWORK ENTITIES IN A MOBILE COMMUNICATION SYSTEM

TECHNICAL FIELD

Embodiments disclosed herein relate to a Fifth Generation (5G) communication network, and more particularly to edge performance assurance in the 5G communication network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G communication network comprises of a 5G Access Network (AN), a 5G Core Network (CN) and a User Equipment (UE) (as disclosed in 3rd Generation Partnership Project Technical Specification (3GPP TS) 23.501). The 5G system is expected to be able to provide optimized support for a variety of different communication services, different traffic loads, and different end user communities. For example, the communication services using network slicing may include Vehicle-to-everything (V2X) services. The 5G communication network aims to enhance its capability to meet Key Performance Indicators (KPIs) that emerging V2X applications require.

For these advanced applications, the requirements, such as data rate, reliability, latency, communication range and speed, are made more stringent. The 5G seamless enhanced Mobile Broadband (eMBB)—As one of the key technologies to enable network slicing, fixed mobile convergence (FMC) which includes wireless-to-the-everything (WTTx) and fibre-to-the-everything (FTTx), is expected to provide native support for network slicing. For optimization and resource efficiency, the 5G communication network will select the most appropriate 3GPP or non-3GPP access technology for a communication service, potentially allowing multiple access technologies to be used simultaneously for one or more services active on the UE. Support for massive Internet of Things (mIoT) brings many new requirements in addition to the MBB enhancements. Communication services with massive IoT connections such as smart households, smart grid, smart agriculture and smart meter will require the support of a large number and high-density IoT devices to be efficient and cost effective. An operator of the 5G communication network can use one or more network slice instances to provide these communication services, which require similar network characteristics, to different vertical industries. The 3GPP TS 28.530 and 28.531 defines the management of Network Slice (NS) in the 5G communication network. It also defined the concept of communication services, which are provided using one or multiple network slices. A Network Slice Instance (NSI) may support multiple Communication Service Instances (CSI). Similarly, the CSI may utilize multiple NSIs.

Further, 3GPP SA6 is working on an architecture for enabling edge computing (as per 3GPP TR 23.558), which specifies an application framework or an enabling layer platform to support an edge computing in the 3GPP specified networks, (e.g. discovery of edge services, authentication of the clients). The work includes the interactions between the UE and the enabling layer platform, and the interactions between the applications deployed over edge and the enabling layer platform. Further, the work is to facilitate integration with the underlying 3GPP core network. The work defines Edge Application Server (EAS) or Edge Application as a piece of software running and deployed on virtual infrastructure at the edge of the 3GPP network.

DISCLOSURE OF INVENTION

Technical Problem

Performance assurance of edge components defined by the SA6 is crucial part of overall management of edge component. The EAS and the edge enabler server (EES) are deployed in the operator premises at the edge of the network, whereas an edge configuration server (ECS) is deployed at a central location serving multiple EES.

Solution to Problem

Accordingly, embodiments herein disclose methods for handling performance of an edge network entity in an edge data network. The method includes creating, by an edge consumer, a measurement job request to collect performance measurement information associated with at least one edge network entity. Further, the method includes sending, by the edge consumer, the created measurement job request to an edge producer. Further, the method includes receiving, by the edge consumer, the performance measurement information associated with the at least one edge network entity from the edge producer based on the created measurement job request.

In an embodiment, the performance measurement information associated with the at least one edge network entity is collected, by the edge producer, as per the information provided in the measurement job request.

In an embodiment, the method further includes performing, by the edge consumer, at least one action upon determining that a performance of the at least one edge network entity does not meet a pre-determined threshold based on the received performance measurement information, where the action comprises a scaling of the related edge network entity, indicating the OSS entity about a clock check, EAS instantiation at a particular location and EES instantiation at a particular location.

In an embodiment, the edge network entity comprises an EAS, an EES, and an ECS.

In an embodiment, the performance measurement information associated with the EAS comprises a virtual resource usage and a round trip packet delay between an Application Client (AC) of a UE and the EAS.

In an embodiment, the performance measurement information associated with the EES comprises a virtual resource usage, a mean EEC registration, a mean EEC subscription, a mean EAS registration, a mean EAS discovery, a mean UE location reporting Application programming interface (API) attempt, a mean User Plane (UP) path management API subscription, a mean UE identifier API attempt, and a mean client information subscription.

In an embodiment, the performance measurement information associated with the ECS comprises a virtual resource usage, a mean EES registration, a mean EES subscription, and a mean service provisioning attempt.

In an embodiment, the method further includes sending, by the edge consumer, a subscription request to the edge producer for collecting the performance measurement information. Further, the method includes receiving, by the edge consumer, a notification of the subscription request from the edge producer.

In an embodiment, the method further includes sending, by the edge consumer, a streaming connection request to the edge producer. Further, the method includes receiving, by the edge consumer, a streaming data from the edge producer based on the streaming connection request.

Accordingly, embodiments herein disclose methods for handling performance of an edge network entity in an edge data network. The method includes receiving, by an edge producer, a measurement job request from an edge consumer. The measurement job request collects performance measurement information associated with an edge network entity. Further, the method includes acquiring, by the edge producer, the performance measurement information associated with the edge network entity based on the received measurement job request. Further, the method includes sending, by the edge producer, the performance measurement information associated with the edge network entity to the edge consumer.

Accordingly, embodiments herein disclose an edge consumer for handling performance of an edge network entity in an edge data network. The edge consumer includes an edge network entity performance controller coupled with a processor and a memory. The edge network entity performance controller is configured to create a measurement job request to collect performance measurement information associated with an edge network entity. Further, the edge network entity performance controller is configured to send the created measurement job request to an edge producer. Further, the edge network entity performance controller is configured to receive the performance measurement information associated with the edge network entity from the edge producer based on the created measurement job request.

Accordingly, embodiments herein disclose an edge producer for handling performance of an edge network entity in an edge data network. The edge producer includes an edge network entity performance controller coupled with a processor and a memory. The edge network entity performance controller is configured to receive a measurement job request from an edge consumer. The measurement job request collects performance measurement information associated with the edge network entity. Further, the edge network entity performance controller is configured to acquire the performance measurement information associated with the edge network entity based on the received measurement job request. Further, the edge network entity performance controller is configured to send the performance measurement information associated with the edge network entity to the edge consumer.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to disclose a method for handling performance of an edge network entity (e.g., EAS, EES and ECS) in an edge data network.

Another object of the embodiments herein is to provision for various performance measurements to be used for performance assurance of the EAS, the EES and the ECS.

Another object of the embodiments herein is to provision for the EES performance assurance based on a virtual resource utilization, successful EAS and EEC registration, successful EES service API consumption, successful EAS discovery and successful EEC subscription.

Another object of the embodiments herein is to provision for the ECS performance assurance based on a virtual resource utilization, successful service provisioning, successful EES registration and successful EEC subscriptions.

Another object of the embodiments herein is to provision for the EAS performance assurance based on virtual resource utilization and round-trip packet delay between an Application Client (AC) of a UE and the EAS.

BRIEF DESCRIPTION OF DRAWINGS

FIG. 5 is a flow diagram illustrating a method, implemented by the edge producer, for handling performance of the edge network entity, according to embodiments as disclosed herein.

FIG. 8 is an example illustration in which 5G performance assurance is depicted in the edge data network, according to according to embodiments as disclosed herein.

MODE FOR THE INVENTION

Figure 1A:
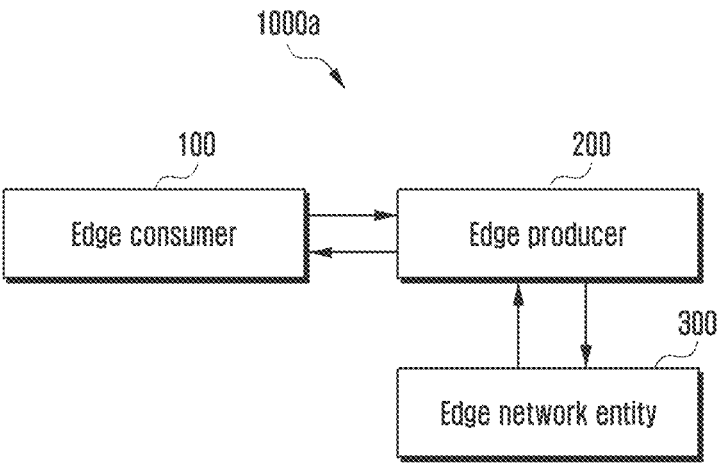
FIG. 1a shows overview of an edge data network for handling performance of an edge network entity, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method for handling performance of an edge network entity in an edge data network. The method includes creating, by an edge consumer, a measurement job request to collect performance measurement information associated with at least one edge network entity. Further, the method includes sending, by the edge consumer, the created measurement job request to an edge producer. Further, the method includes receiving, by the edge consumer, the performance measurement information associated with the at least one edge network entity from the edge producer based on the created measurement job request.

The proposed method can be used to enable provisions for performance assurance of the EAS, the EES and the ECS in the edge data network. In the proposed method, the provision for the EES performance assurance is provided based on virtual resource utilization, successful EAS and EEC registration, successful EES service API consumption, successful EAS discovery and successful EEC subscription. In the proposed method, the provision for ECS performance assurance is provided based on virtual resource utilization, successful service provisioning, successful EES registration and successful EEC subscriptions. In the proposed method, the provision for EAS performance assurance is provided based on virtual resource utilization and round-trip packet delay between an AC of a UE and the EAS. Thus, results in better EAS performance assurance considering optimal user experience.

Referring now to the drawings, and more particularly to FIGS. 1a through 8, where similar reference characters denote corresponding features consistently throughout the figures, there are shown at least one embodiment.

FIG. 1a shows overview of an edge data network (1000a) for handling performance of an edge network entity (300), according to embodiments as disclosed herein. In an embodiment, the edge data network (1000a) includes an edge consumer (100), an edge producer (200) and an edge network entity (300). The edge network entity (300) can be, for example, but not limited to an edge application server (EAS) (300a), an edge enabler server (EES) (300b), and an edge configuration server (ECS) (300c) (as shown in the FIG. 6a and FIG. 6b).

In an embodiment, the edge consumer (100) is configured to create a measurement job request to collect performance measurement information associated with the edge network entity (300). The performance measurement information associated with the edge network entity (300) is collected as per the performance measurement information provided in the measurement job request.

In an example, the performance measurement information associated with the EAS (300a) includes a virtual resource usage and a round trip packet delay between an Application Client (AC) (606) of a UE (602) and the EAS (300a). In another example, the performance measurement information associated with the EES (300b) includes a virtual resource usage, a mean EEC registration, a mean EEC subscription, a mean EAS registration, a mean EAS discovery, a mean UE location reporting Application programming interface (API) attempt, a mean User plan (UP) path management API subscription, a mean UE identifier API attempt, and a mean client information subscription. In another example, the performance measurement information associated with the ECS (300c) includes a virtual resource usage, a mean EES registration, a mean EES subscription, and a mean service provisioning attempt.

For creating the measurement job request, the edge consumer (100) is configured to send the created measurement job request to the edge producer (200). The edge producer (200) is configured to receive the measurement job request from the edge consumer (100) and acquire the performance measurement information associated with the edge network entity (300) based on the received measurement job request. Further, the edge producer (200) is configured to send the performance measurement information associated with the edge network entity (300) to the edge consumer (100). In an example, in a subscription request, the edge consumer (100) needs to say what would be the reporting method is File-Reporting or Streaming. Based on the indication, the receiving operation of the performance measurement information is NotifyfileRedy in case of reporting method is the File-Reporting and reportStreamData in case of reporting method is streaming.

Further, the edge consumer (100) is configured to perform an action upon determining that a performance of the edge network entity (300) does not meet a predetermined threshold based on the received performance measurement information. The pre-determined threshold is defined by an operator of the edge data network (1000*a*) or a service provider (not shown). The action can be, for example, but not limited to a scaling of the related edge network entity (300), indicating an OSS entity/and a business support system (BSS) entity (704) (as shown in the FIG. 7*a* FIG. 7*c*) about a clock check, an EAS instantiation at a particular location (e.g., servicing location) and an EES instantiation at a particular location.

Further, the edge consumer (100) is configured to send a subscription request to the edge producer (200) for collecting the performance measurement information and receive a notification of the subscription request from the edge producer (200). Further, the notification will be notifyFileReady, which tell the edge consumer (100) that the file it request is ready and user can download it. The edge consumer (100) then download the file form the specified location provided in the notification.

Further, the edge consumer (100) is configured to send a streaming connection request to the edge producer (200) and receive a streaming data from the edge producer (200) based on the streaming connection request.

When it comes to the EAS/EES/ECS performance assurance, the entity playing role of the edge producer (200) will be an Edge Computing Service Provider (ECSP) or a PLMN management system. When it comes to the EAS performance assurance, the entity playing role of the edge consumer (100) will be an Application Service Provider (ASP). When it comes to the EES and ECS performance assurance, the entity playing role of the edge consumer (100) could be any 5G system entity.

Figure 1B:
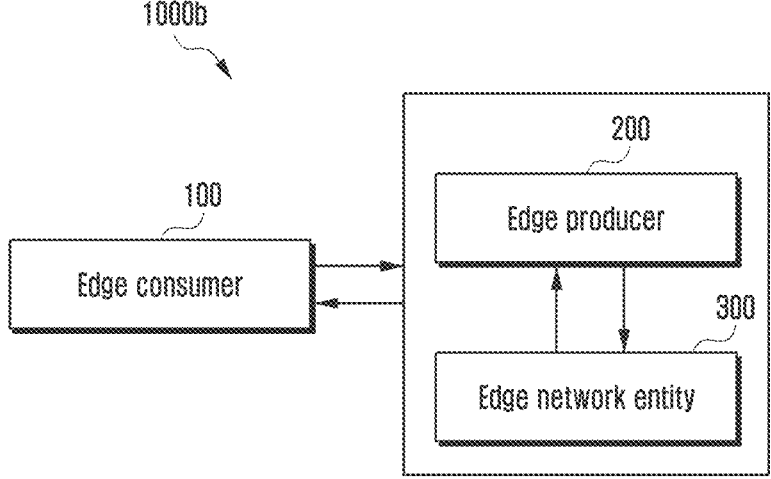
FIG. 1b shows another overview of the edge data network for handling performance of the edge network entity, according to embodiments as disclosed herein.

FIG. 1*b* shows another overview of the edge data network (1000*b*) for handling performance of the edge network entity (300), according to embodiments as disclosed herein. The operations and functions of the edge data network (1000*a*) including the edge consumer (100), the edge producer (200) and the edge network entity (300) are explained in conjugation with the FIG. 1*a*. But, in the FIG. 1*b*, the edge producer (200) is associated/integrated with the edge network entity (300).

Figure 2:
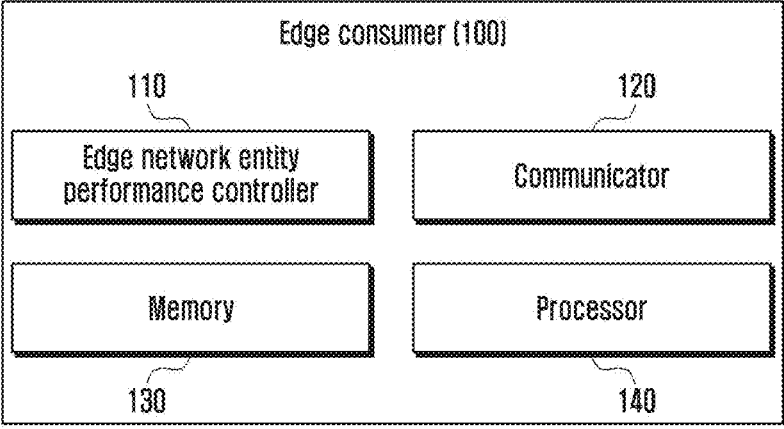
FIG. 2 shows various hardware components of an edge consumer, according to embodiments as disclosed herein.

FIG. 2 shows various hardware components of the edge consumer (100), according to embodiments as disclosed herein. In an embodiment, the edge consumer (100) includes an edge network entity performance controller (110), a communicator (120), a memory (130), and a processor (140). The processor (140) is operated with the edge network entity performance controller (110), the communicator (120), and the memory (130). Further, the edge network entity performance controller (110) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

In an embodiment, the edge network entity performance controller (110) is configured to create the measurement job request to collect performance measurement information associated with the edge network entity (300). After creation, the edge network entity performance controller (110) is configured to send the created measurement job request to the edge producer (200). Based on the created measurement job request, the edge network entity performance controller (110) is configured to receive the performance measurement information associated with the edge network entity (300) from the edge producer (200).

Further, the edge network entity performance controller (110) is configured to perform the action upon determining that the performance of the edge network entity (300) does not meet the pre-determined threshold based on the received performance measurement information, where the action comprises a scaling of the related edge network entity, indicating the OSS entity (704) about the clock check, EAS instantiation at the particular location and EES instantiation at a particular location.

Further, the edge network entity performance controller (110) is configured to send a subscription request to the edge producer (200) for collecting the performance measurement information and receive the notification of the subscription request from the edge producer (200).

Further, the edge network entity performance controller (110) is configured to send the streaming connection request to the edge producer (200) and receive the streaming data from the edge producer (200) based on the streaming connection request.

Further, the processor (140) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

At least one of the plurality of modules may be implemented through the AI model. A function associated with AI may be performed through the non-volatile memory, the volatile memory, and the processor (140). The processor (140) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the nonvolatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the edge consumer (100) but it is to be understood that other embodiments are not limited thereon. In other embodiments, the edge consumer (100) may include less or more number of components. Further, the labels or names of the components are used only for illustrative purpose and does not limit the scope of the invention. One or more components can be combined together to perform same or substantially similar function in the edge consumer (100).

Figure 3:
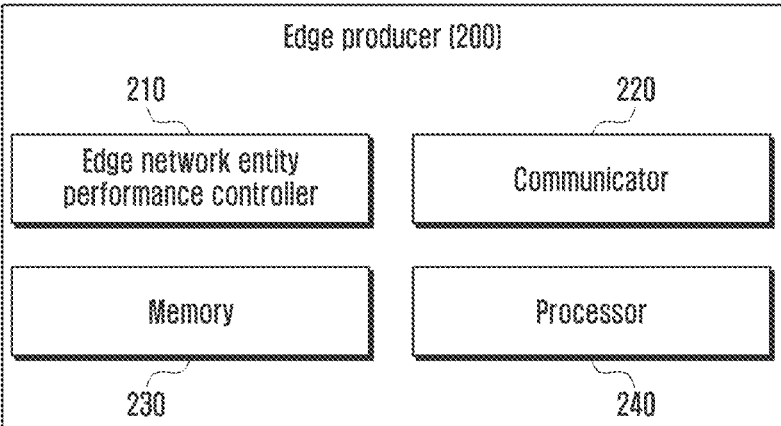
FIG. 3 shows various hardware components of an edge producer, according to embodiments as disclosed herein.

FIG. 3 shows various hardware components of the edge producer (200), according to embodiments as disclosed herein. In an embodiment, the edge producer (200) includes an edge network entity performance controller (210), a communicator (220), a memory (230), and a processor (240). The processor (240) is operated with the edge network entity performance controller (210), the communicator (220), and the memory (230). In an embodiment, the edge network entity performance controller (210) is configured to receive the measurement job request from the edge consumer (100). Based on the received measurement job request, the edge network entity performance controller (210) is configured to acquire the performance measurement information associated with the edge network entity (300). The edge network entity performance controller (210) is configured to send the performance measurement information associated with the edge network entity (300) to the edge consumer (100).

Further, the edge network entity performance controller (210) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (240) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

At least one of the plurality of modules may be implemented through the AI model. A function associated with AI may be performed through the non-volatile memory, the volatile memory, and the processor (240). The processor (240) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 shows various hardware components of the edge producer (200) but it is to be understood that other embodiments are not limited thereon. In other embodiments, the edge producer (200) may include less or more number of components. Further, the labels or names of the components are used only for illustrative purpose and does not limit the scope of the invention. One or more components can be combined together to perform same or substantially similar function in the edge producer (200).

Figure 4:
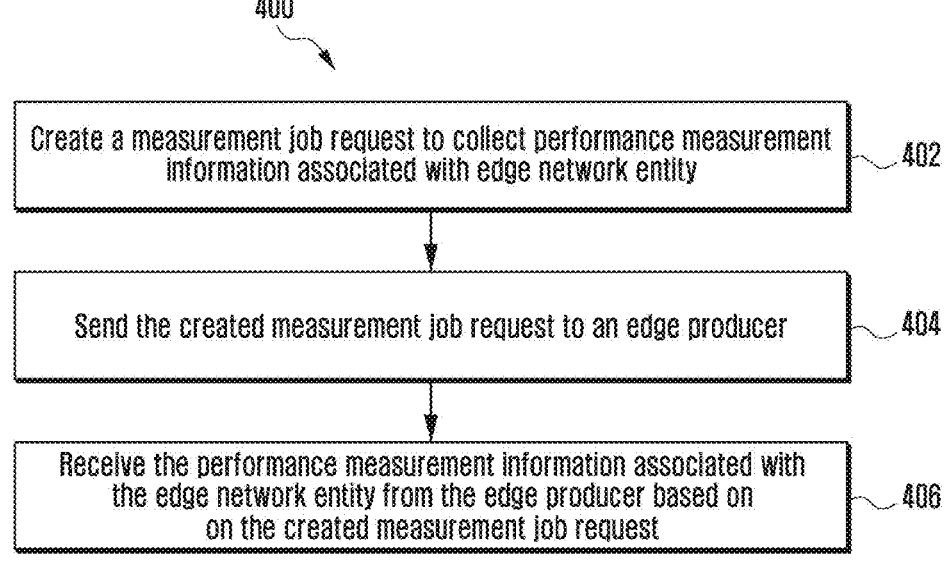
FIG. 4 is a flow diagram illustrating a method, implemented by the edge consumer, for handling performance of the edge network entity, according to embodiments as disclosed herein.

FIG. 4 is a flow diagram (400) illustrating a method, implemented by the edge consumer (100), for handling performance of the edge network entity (300), according to embodiments as disclosed herein. The operations (402-406) are performed by the edge network entity performance controller (110).

At 402, the method includes creating the measurement job request to collect performance measurement information associated with the edge network entity (300). At 404, the method includes sending the created measurement job request to the edge producer (200). At 406, the method includes receiving the performance measurement information associated with the edge network entity (300) from the edge producer (200) based on the created measurement job request.

FIG. 5 is a flow diagram (500) illustrating a method, implemented by the edge producer (200), for handling performance of the edge network entity (300), according to embodiments as disclosed herein. The operations (502-506) are performed by the edge network entity performance controller (210).

At 502, the method includes receiving the measurement job request from the edge consumer (100). The measurement job request collects performance measurement information associated with the edge network entity (300). At 504, the method includes acquiring the performance measurement information associated with the edge network entity (300) based on the received measurement job request. At 506, the method includes sending the performance measurement information associated with the edge network entity (300) to the edge consumer (100).

Figure 6A:
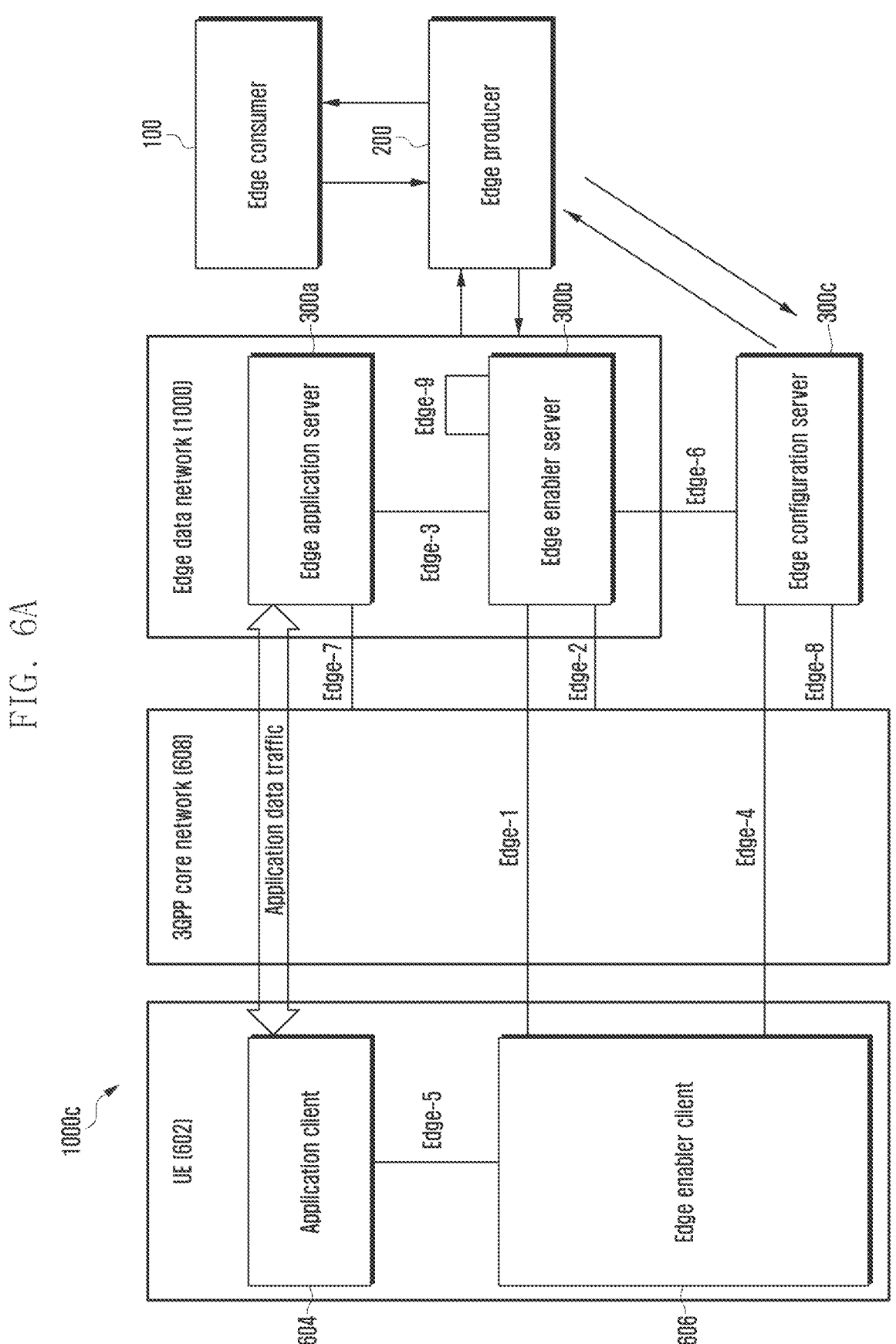
FIG. 6a shows overview architecture of the edge data network for handling performance of the edge network entity, according to embodiments as disclosed herein.

FIG. 6a shows overview architecture of the edge data network (1000c) for handling performance of the edge network entity (300), according to embodiments as disclosed herein. The edge data network (1000c) comprises of a 5G Access Network (AN), a 5G core network (not shown), a UE (602) (as disclosed in 3GPP TS 23.501), the edge consumer (100), the edge producer (200) and the edge network entity (300). The operations and functions of the edge consumer (100), the edge producer (200) and the edge network entity (300) are already explained in connection with the FIG. 1a to FIG. 5. Further, the UE (602) can be, for example, but not limited to a cellular phone, a smart phone, a smart watch, a smart fridge, a smart TV, a smart washing machine, a smart dishwasher, a Closed-circuit television (CCTV), a Personal Digital Assistant (PDA), a tablet computer, a laptop computer, a virtual reality device, an immersive system, an Internet of Things (IoT), a smart sensor, a drone and a vehicle.

The application architecture (documented in 3GPP TS 23.558) comprises of the EES (300b), primarily responsible for enabling discovery of the EASs (300a). The EEC (300b) is providing support functions, such as EAS discovery in the UE (602). The ECS (300c) is providing configurations to the EEC (606) to connect with the EAS (306).

The application client (604) on the UE (602) can be "Edge-aware" and "Edge-unaware". In summary, with a support of an enabling layer, the 3GPP core network (608) offer native support to several Edge capabilities, including:

1. On-demand service provisioning by the ECS (300c) and the use of query filters on the EES (300b) to allow rich discovery of the EASs (300a) via the EEC (606).

2. Due to the flexible nature, and the availability of edge data networks (1000c), the EAS capabilities can vary due to multiple reasons, such as change in deployments, mobility of the UE (602) etc. The UE (600) can subscribe to such dynamic changes to fine tune the services offered to an application client (AC) (604).

3. The EASs (300a) can utilize service API(s) exposed by the EES (300b), which in turn are built on the capabilities of SCEF/NEF northbound APIs (with and without CAPIF framework), enabling the EASs (300a) to access 3GPP network capability exposure functions.

4. With UE mobility, the serving edge or cloud may change or become more suitable for serving the AC (604). To enable continuity of service in such scenarios, the architecture supports transfer of the UE's application context between the edge data networks (1000c) for seamless service continuity.

Figure 6B:
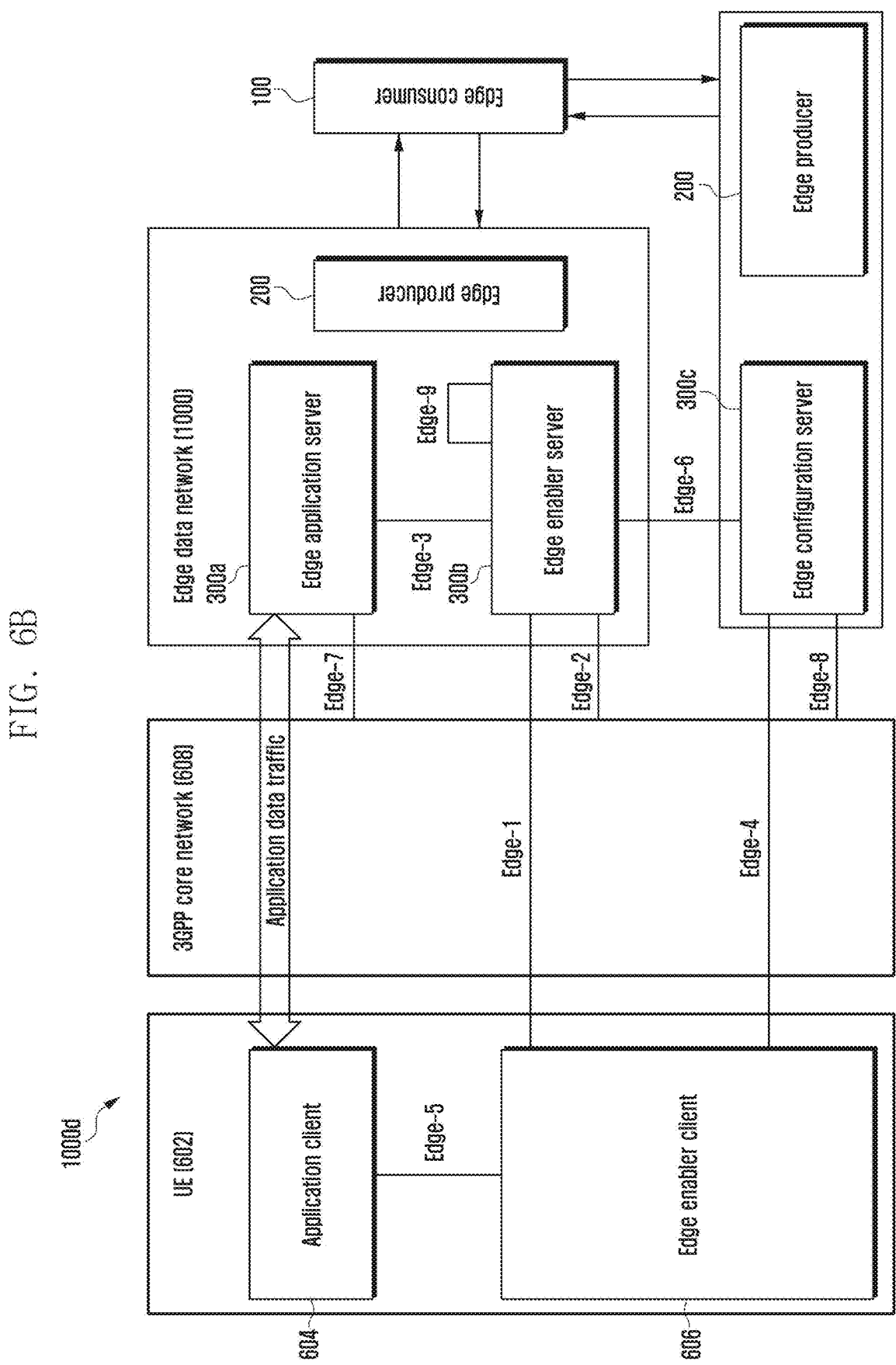
FIG. 6b shows another overview architecture of the edge data network for handling performance of the edge network entity, according to embodiments as disclosed herein.

FIG. 6b shows another overview architecture of the edge data network (1000d) for handling performance of the edge network entity (300), according to embodiments as disclosed herein. The operations and functions of the edge data network (1000d) are explained in conjunction with the FIG. 6a. But, in the FIG. 6b, the edge producer (200) is associated/integrated with the edge network entity (300). Hereafter, the label of the edge data network is 1000.

Figure 7A:
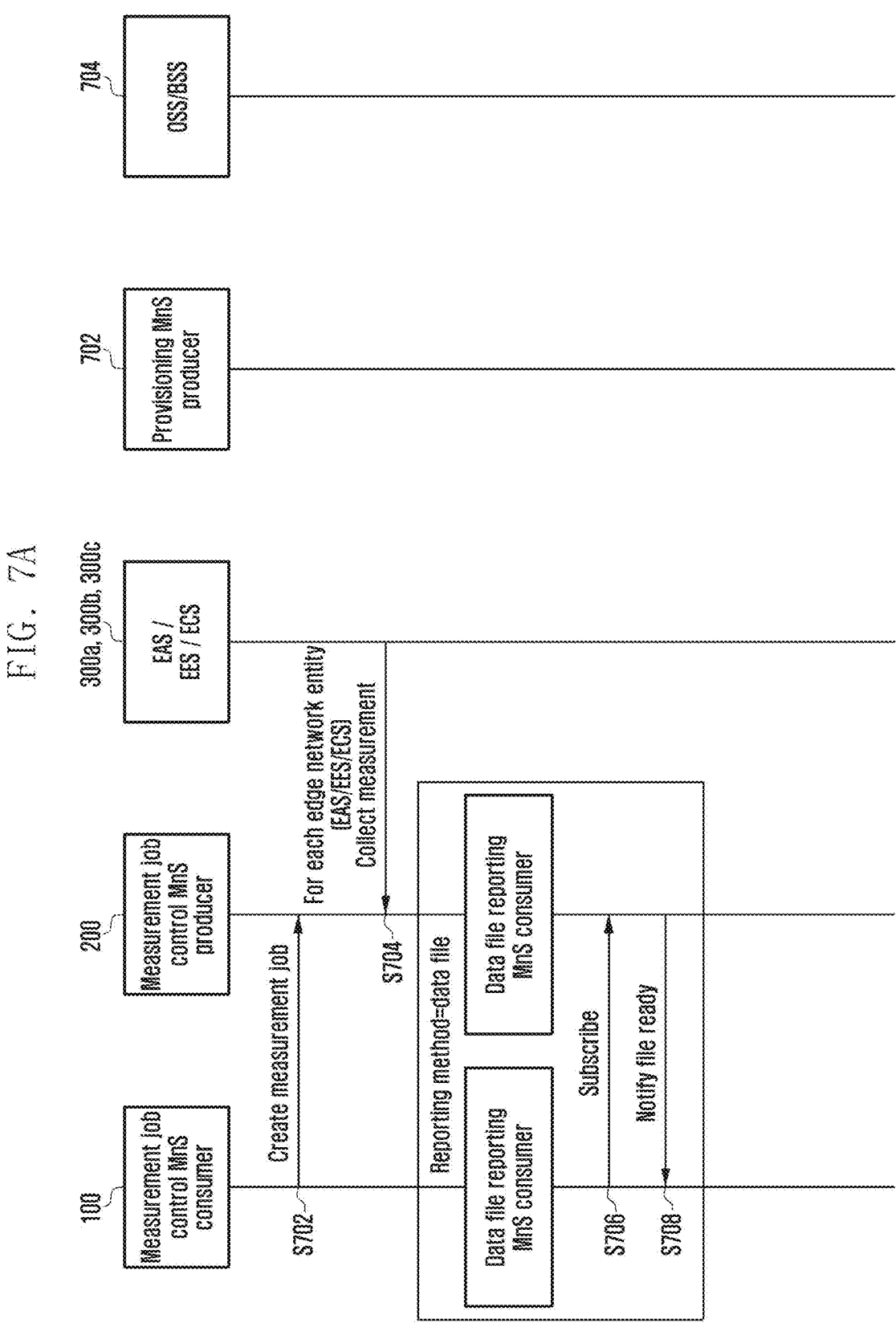
FIG. 7a is a sequence flow diagram illustrating step by step operations for handling performance of the edge network entity, according to embodiments as disclosed herein.
Figure 7B:
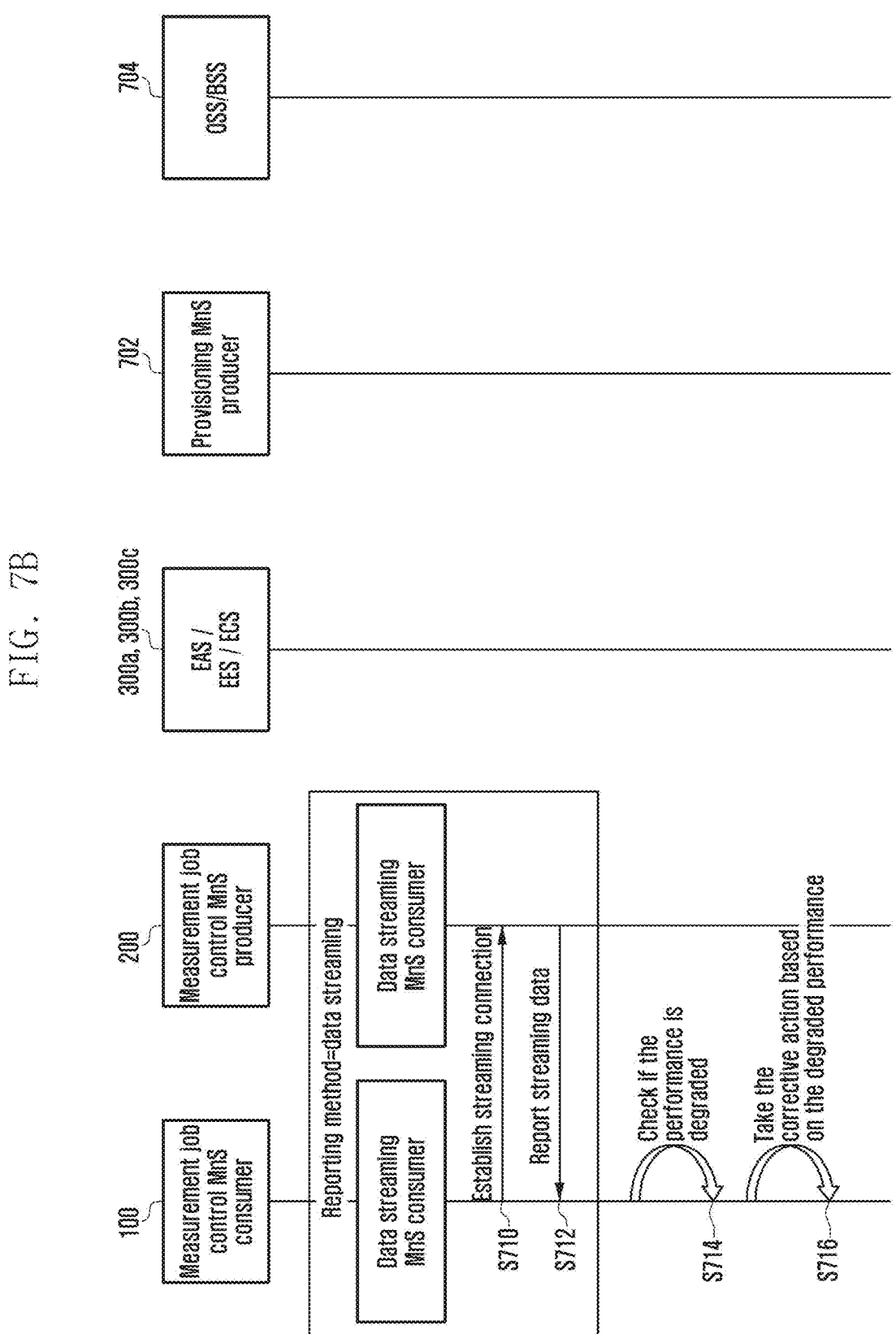
FIG. 7b is a sequence flow diagram illustrating step by step operations for handling performance of the edge network entity, according to embodiments as disclosed herein.
Figure 7C:
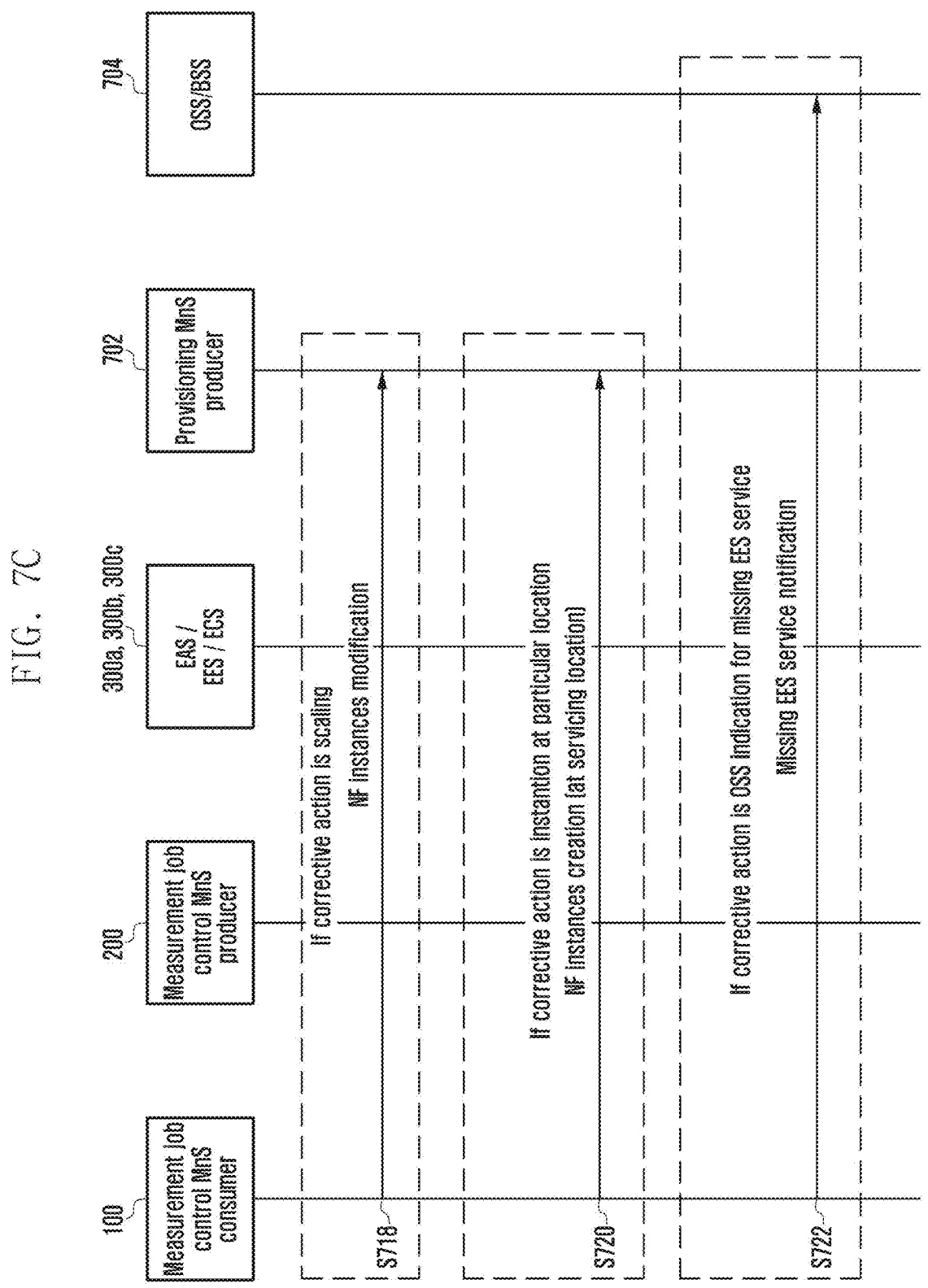
FIG. 7c is a sequence flow diagram illustrating step by step operations for handling performance of the edge network entity, according to embodiments as disclosed herein.

FIG. 7a-FIG. 7c show a sequence flow diagram illustrating step by step operations for handling performance of the edge network entity (300), according to embodiments as disclosed herein.

At S702, the edge consumer (100), acting as Measurement Job Control MnS consumer, creates the measurement job to collect proposed performance measurements using createMeasurementJob as defined in TS 28.550. Table 1 shows the proposed performance measurements to be collected from each edge component. The reporting entity shall report the given measurements to OAM entities (for example, Measurement Job control MnS Producer).

TABLE 1

| Reporting entity | Performance Measurements |
|---|---|
| EAS | Virtual resource usage (MeanProcessor, MeanMemory and MeanDisk). |
| | Round trip packet delay between AC of a UE and EAS |
| EES | Virtual resource usage (MeanProcessor, MeanMemory and MeanDisk). |
| | Mean EEC Registration |
| | Mean EEC Subscription. |
| | Mean EAS Registration. |
| | Mean EAS Discovery. |
| | Mean UE Location Reporting API attempts. |
| | Mean UP path management API subscription. |
| | Mean UE Identifier API attempts. |
| | Mean Client Information subscription. |
| ECS | Virtual resource usage (MeanProcessor, MeanMemory and MeanDisk). |
| | Mean EES Registration. |
| | Mean EES Subscription. |
| | Mean Service Provisioning attempts. |

At S704, the edge producer (200), acting as Measurement job control MnS producer, collects the proposed performance measurements from the EAS (300a), the EES (300b) and the ECS (300c). If the reportingMethod in createMeasurementJob was data file, at S706, the edge consumer (100) takes the role of Data File reporting MnS Consumer and subscribe for notifyFileready notification as defined in TS 28.550 and TS 28.532. At S708, the edge producer (200), acting as Data File reporting MnS Producer sends the notifyfileReady notification when the file containing required performance measurements is ready as defined in TS 28.550 and TS 28.532. If the reportingMethod in createMeasurementJob was data streaming, at S710, the edge consumer (100) takes the role of Data Streaming MnS Consumer and establish stream connection using establishStreamingConnection operation as defined in TS 28.550 and TS 28.532. At S712, the edge producer (200), acting as Data Streaming MnS Producer sends the required measurement stream using reportStreamData operation as defined in TS 28.550. Depending on the performance measurement received, at S714, the edge producer (200) decides if the performance is degraded. Depending on the performance degradation, at S716, the edge producer (200) decides the corrective actions. Table 2 shows what corrective action is to be taken in case of a particular measurement target is degraded.

TABLE 2

| | Performance Measurements | Performance degradation condition | Threshold (Failing %) | Corrective Actions |
|---|---|---|---|---|
| EES | Mean successful EAS registration | Inadequate virtual resource available to EES | 60% | EES Scale Up/Out |
| | | Security Credential failing due to clock sync issue | 20% | OSS indication: Clock check required for EES |
| | Mean successful EEC registration | Inadequate virtual resource available to EES | 60% | Scale Up/Out |
| | | Security Credential failing due to clock sync issue | 20% | OSS indication: Clock check required for EES |
| | Mean successful API attempts | Inadequate virtual resource available to EES | 60% | Scale Up/Out |
| | | Unavailability of the required 3 GPP network capability exposure | 60% | OSS indication: Request related 3GPP interface implementations |
| | | Security Credential failing due to clock sync issue | 20% | OSS indication: Clock check required for EES |
| | Mean successful EAS discovery | Unavailability of the EAS for the expected location (e.g., area of interest). | 50% | EAS instantiation at the failed location |
| | | Security Credential failing due to clock sync issue | 20% | OSS indication: Clock check required for EES |
| | Mean successful EEC subscriptions | Inadequate virtual resource available to EES | 60% | Scale Up/Out |
| | | Security Credential failing due to clock sync issue | 20% | OSS indication: Clock check required for EES |
| | | Unavailability of the EAS for the expected location (e.g., area of interest). | 50% | EAS instantiation at the failed location |
| ECS | Mean successful service provisioning | Unavailability of the EES for the expected location (e.g., area of interest). | 50% | EES instantiation at the failed location |
| | | Security Credential failing due to clock sync issue | 20% | OSS indication: Clock check required for EES |
| | Mean successful EEC subscriptions | Inadequate virtual resource available to ECS | 60% | Scale Up/Out |
| | | Security Credential failing due to clock sync issue | 20% | OSS indication: Clock check required for EES |
| | | Unavailability of the EES for the expected location (e.g., area of interest). | 50% | EES instantiation at the failed location |
| | Mean successful EES registration | Inadequate virtual resource available to ECS | 60% | Scale Up/Out |
| | | Security Credential failing due to clock sync issue | 20% | OSS indication: Clock check required for EES |

At S718, depending on the corrective action, the edge producer (200) initiate the NF instance modification procedure as defined in TS 28.531, wherein the edge producer (200) acts as the provisioning MnS producer (702) on receiving the request from the edge consumer (100). At S720, depending on the corrective action, the edge producer initiate NF Instance creation procedure as defined in TS 28.531, wherein the edge producer (200) acts as the provisioning MnS producer (702) on receiving the request from the edge consumer (100). At S722, depending on the corrective action, the edge producer initiates an indication towards OSS/BSS entity (704) describing the performance degradant issue for manual intervention, wherein the edge producer (200) acts as the provisioning MnS producer (702) on receiving request from the edge consumer (100).

Examples of the required performance measurements for EAS (300a) are, but not limited to, Virtual resource usage (MeanProcessor, MeanMemory and MeanDisk), and Round trip packet delay between the AC (604) of the UE (602) and the EAS (300a).

Required performance measurements for EES (300b) are, but not limited to Virtual resource usage (MeanProcessor, MeanMemory and MeanDisk), Mean EEC Registration, Mean EEC Subscription, Mean EAS Registration, Mean EAS Discovery, Mean UE Location Reporting API attempts, Mean UP path management API subscription, Mean UE Identifier API attempts, and Mean Client Information subscription.

Required performance measurements for ECS (300*c*) are, but not limited to Virtual resource usage (MeanProcessor, MeanMemory and MeanDisk), Mean EES Registration, Mean EES Subscription, and Mean Service Provisioning attempts.

Performance assurance of the edge component(s) is provided, enabling the efficient deployment of edge network resulting in better services.

The various actions, acts, blocks, steps, or the like in the flow diagrams (400 and 500) may be performed in the order presented, in a different order or simultaneously. Further, in some embodiments, some of the actions, acts, blocks, steps, or the like may be omitted, added, modified, skipped, or the like without departing from the scope of the invention.

Figure 8:
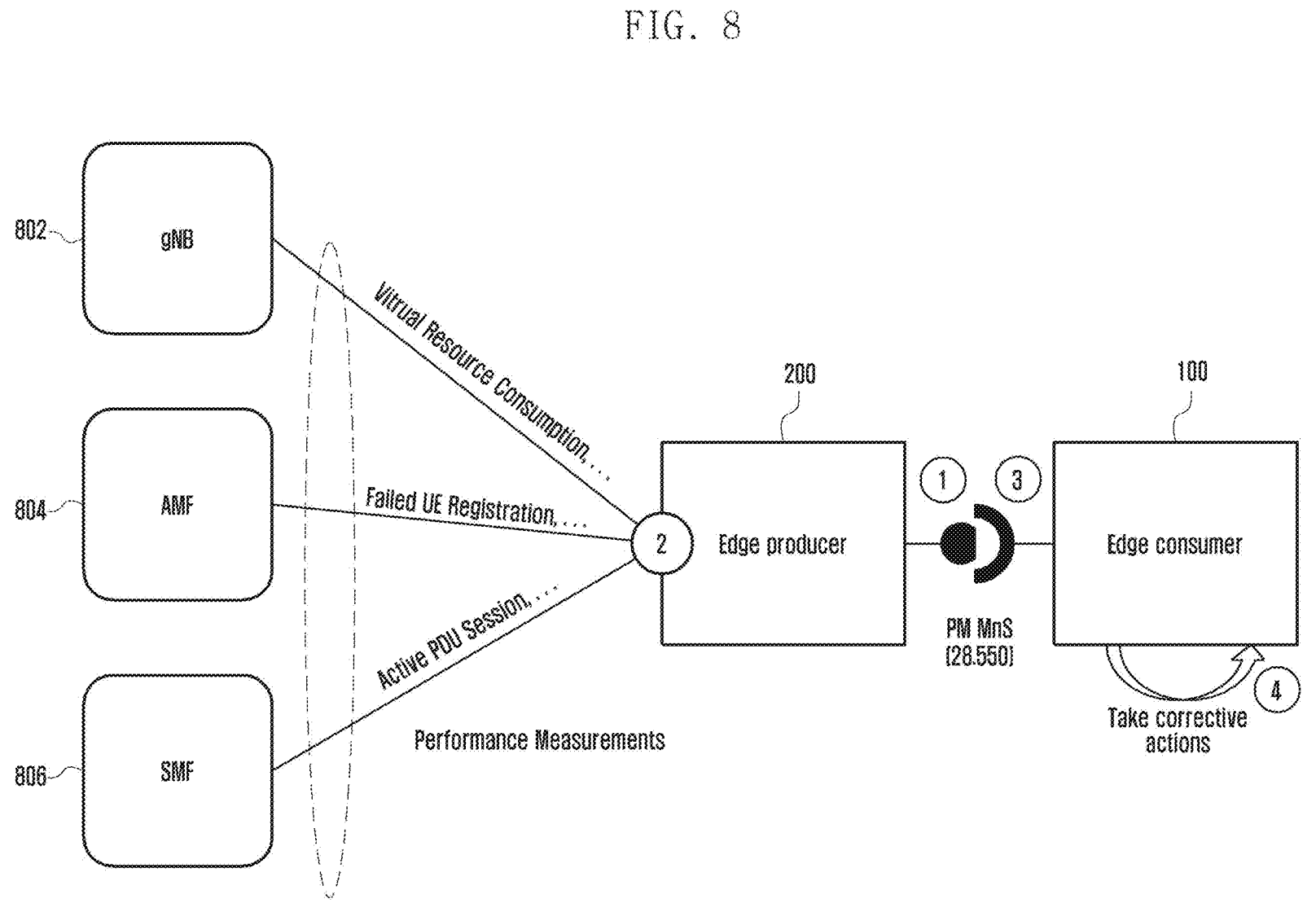

FIG. 8 is an example illustration in which 5G performance assurance is depicted in the edge data network (1000*e*), according to according to embodiments as disclosed herein. As shown in the FIG. 8, at 1, the edge consumer (100) requests (using a PM MnS) for the collection of various performance measurements (e.g., % of vCPU utilized) for the particular network entity (e.g., gNB (802), AMF (804), and SMF (806)). At 2, the edge producer (200) collects the measurements from the correct network functions. The measurements can be, for example, but not limited to a virtual resource consumption, a failed UE registration, active PDU session, or the like. At 3, the edge producer (200) delivers (using the PM MnS) the measurements to the edge consumer (100). When it comes to the EAS/EES/ECS performance assurance, the entity playing role of the edge producer (200) will be an Edge Computing Service Provider (ECSP) or a PLMN management system. When it comes to the EAS performance assurance, the entity playing role of the edge consumer (100) will be an Application Service Provider (ASP). When it comes to the EES and ECS performance assurance, the entity playing role of the edge consumer (100) could be any 5G system entity. At 4, depending on the measurement collected, the consumer (100) may take corrective actions (e.g., scale-up or the like).

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a first network entity operating as a producer of a performance assurance management service (MnS) in a communication system, the method comprising:

receiving, from a second network entity operating as a consumer of the performance assurance MnS, a measurement job request, the measurement job request including information indicating a reporting method for collected performance data as a file reporting or a streaming reporting;

based on the measurement job request, collecting performance measurement information from at least one of an edge application server (EAS), an edge enabler server (EES), and an edge configuration server (ECS); and sending, to the second network entity, the collected performance measurement information or a notification to indicate that a file containing the collected performance measurement information is ready, based on the indicated reporting method.

2. The method of claim 1, wherein the measurement job request further includes information indicating from which of the EAS, the EES, and the ECS the performance measurement information is to be collected.

3. The method of claim 1, wherein the performance measurement information associated with the EAS includes information on a virtual resource usage for the EAS.

4. The method of claim 1, wherein the performance measurement information associated with the EES includes at least one of information on a virtual resource usage for the EES, information on a number of edge enabler client (EEC) registration procedures, information on a number of EAS registration procedures, and information on a number of EAS discovery procedures.

5. The method of claim 1, wherein the performance measurement information associated with the ECS includes at least one of information on a virtual resource usage for the ECS, information on a number of EES registration procedures, and information on a number of service provisioning procedures.

6. A first network entity operating as a producer of a performance assurance management service (MnS) in a communication system, the first network entity comprising:

a transceiver; and at least one processor configured to:

receive, from a second network entity operating as a consumer of the performance assurance MnS via the transceiver, a measurement job request, the measurement job request including information indicating a reporting method for collected performance data as a file reporting or a streaming reporting, based on the measurement job request, collect performance measurement information from at least one of an edge application server (EAS), an edge enabler server (EES), and an edge configuration server (ECS), and send, the second network entity via the transceiver, the collected performance measurement information or a notification to indicate that a file containing the collected performance measurement information is ready, based on the indicated reporting method.

7. The first network entity of claim 6, wherein the measurement job request further includes information indicating from which of the EAS, the EES, and the ECS the performance measurement information is to be collected.

8. The first network entity of claim 6, wherein the performance measurement information associated with the EAS includes information on a virtual resource usage for the EAS.

9. The first network entity of claim 6, wherein the performance measurement information associated with the EES includes at least one of information on a virtual resource usage for the EES, information on a number of edge enabler client (EEC) registration procedures, information on a number of EAS registration procedures, and information on a number of EAS discovery procedures.

10. The first network entity of claim 6, wherein the performance measurement information associated with the ECS includes at least one of information on a virtual resource usage for the ECS, information on a number of EES registration procedures, and information on a number of service provisioning procedures.

\* \* \* \* \*